Figure 1:
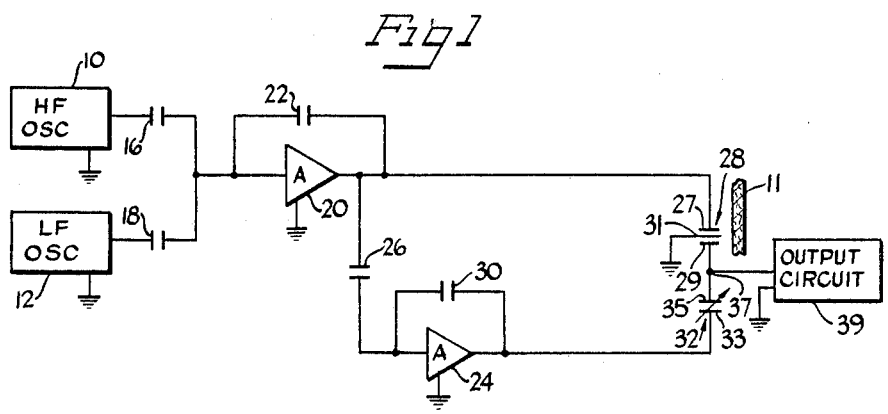

Dec. 6, 1966   A. NORWICH   3,290,588

DIELECTRIC MEASURING SYSTEM INCLUDING PHASE INVERTING MEANS

Filed March 27, 1963

INVENTOR.
*Alan Norwich*
BY *Anderson, Luedeka, Fitch,*
*Even & Tabin*
ATTORNEYS United States Patent Office 3,290,588
Patented Dec. 6, 1966

3,290,588
DIELECTRIC MEASURING SYSTEM INCLUDING
PHASE INVERTING MEANS
Alan Norwich, Columbus, Ohio, assignor to Industrial
Nucleonics Corporation, a corporation of Ohio
Filed Mar. 27, 1963, Ser. No. 268,268
17 Claims. (Cl. 324—61)

This application is a continuation-in-part of the copending application of Alan Norwich, Serial No. 174,748, filed February 21, 1962, now abandoned, for "Measuring System."

This invention relates generally to a measurement system having a plurality of signals at different frequencies applied to a capacitance probe, and specifically to a simplified bridge circuit for use in such a system.

The present invention is an improvement on the system described in the copending application, Serial No. 41,975, filed July 11, 1960, for "Measuring System" by Albert F. G. Hanken, now Patent No. 3,155,900. In that system the capacitance probe forms part of a bridge circuit. The probe includes as a dielectric the material to be measured in an industrial process. The bridge is simultaneously supplied with a pair of signals at separate frequencies, that is, the capacitive arms of the bridge have applied at their outer terminals balanced voltages at widely displaced frequencies. There is produced across the bridge a pair of signals at the respective frequencies but at an amplitude varying in magnitude in accordance with the unbalance of the bridge at each frequency. The unbalanced signals are amplified in a wideband amplifier and then applied to a pair of filters. One filter is adapted to select the signal at the first frequency and pass it to a first detector. The output of the detector is a D.C. signal of a magnitude varying in accordance with the amplitude of the signal at the first frequency. In a similar manner the other filter is adapted to select the signal at the second frequency and pass it to a second detector. The output of the second detector is a D.C. signal of a magnitude varying in accordance with the amplitude of the signal at the second frequency. The two signals at the output of the two detectors are then applied to a computer for indicating a response relating to a qualitative or quantitative property of the material in the capacitance probe.

In the aforementioned copending application it was necessary to employ frequency sensitive elements in the measuring bridge. Any frequency change consequently required readjusting the tuned circuits. Also with tuned circuits only the selected frequencies could be utilized. The present invention is a broad band system wherein any frequency within a broad range may be utilized without circuit changes or adjustments. That is, the present bridge circuit can accommodate more than one frequency at the same time without the use of acceptor or rejector circuits for each frequency used. This is particularly advantageous when the instrument is to be used for many different processes or over different moisture ranges, as different frequencies are more suitable for different conditions. The present design can accommodate almost any condition, and a single instrument therefore has universal applicability.

Accordingly, it is a general object of the present invention to provide a new and improved bridge circuit for use in a multi-frequency measuring system.

It is a specific object of the present invention to provide a broad band bridge circuit for use in a multi-frequency measuring system that can accommodate more than a single frequency at the same time without other circuit adjustments.

Figure 2:
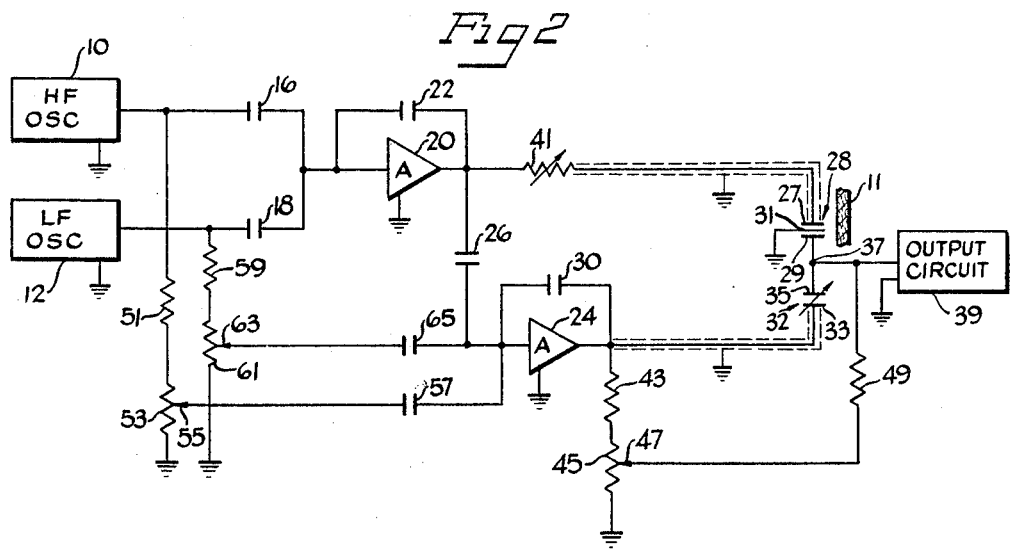

Further objects and features of the present invention will become apparent from the following detailed description when taken in conjunction with the drawings in which:

FIGURE 1 is a schematic diagram of one form of the measuring system of the instant invention; and FIGURE 2 is a schematic diagram of a modified form of the invention shown in FIGURE 1, including phase shift adjusting means.

Referring to FIGURE 1, a pair of oscillator generators 10 and 12 are operative to produce a pair of signals. These two signals are at widely displaced frequencies and are referred to herein as the high and low frequency signals. In certain measurements, it has been found convenient and desirable to use frequencies of 100 and 500 kilocycles. The signals are fed to an A.C. feedback amplifier 20 through respective input impedances 16 and 18. The voltages applied to the amplifier can be adjusted independently of each other—or their ratio—by varying the impedances 16 and 18.

Amplifier 20 is capable of amplifying both frequencies and does not include tuned elements. In this way the amplifier 20 can accommodate any frequency within a given range without making bridge adjustments. The voltage capability of the amplifier 20 must be the peak to peak voltage swing of the low frequency signal required by the bridge plus the peak to peak voltage swing of the high frequency signal. This amplifier, although capable of high gain, is preferred to be operated at a gain of unity with feedback. Feedback is by means of impedance 22 to provide a low output impedance and good gain stability. The amplifier 20 is preferably used as a type of A.C. summing amplifier and the impedances 16, 18 and 22 are preferably capacitors. In this way the two frequencies may be fed simultaneously to the bridge without frequency acceptor or rejector circuits that would normally be required to prevent one frequency source from loading the other. In the preferred form of this invention, with impedances 16, 18 and 22 like and preferably pure capacitors, although not necessarily of equal value, the signals at the output of amplifier 20 are of opposite phase from the output signals from oscillators 10 and 12, and are equal to the sum of the oscillator signals each divided by the ratio of the respective input impedance 16 or 18 to the feedback impedance 22.

The combined signals from amplifier 20 are applied to a first input terminal connected to a plate 27 of the capacitance probe 28. The probe 28 preferably comprises a fringe field capacitor having a second plate 29 and a grounded guard electrode 31 between the plates. The material 11 being measured forms a part of the dielectric of the capacitance probe 28.

The combined signals in addition to being fed to the capacitance probe 28 are also fed through input impedance 26 into a phase inverter amplifier 24. This provides combined signals of phase opposite to the combined signals applied to the capacitance probe 28. The combined signals of opposite phase are applied to a second input terminal connected to a plate 33 of balancing capacitor 32. The other plate 35 of capacitor 32 is connected at measuring terminal 37 to the plate 29 of the capacitance probe 28. This completes a bridge circuit. Signals of one phase are applied between ground (as a reference datum) and plate 27 of capacitance probe 28 and signals of opposite phase are applied between ground and plate 33 of capacitor 32. The output of the bridge circuit is taken between measuring terminal 37 and ground and is applied to output circuit 39 which operates upon the signals to indicate the desired information as to the property or properties of the material 11 being measured.

The amplifier 24 is preferably like amplifier 20 and has a similar feedback impedance 30; preferably impedances 26 and 30 are equal capacitors. The output of amplifier 24 will then be equal to the input to capacitor 26 but of opposite phase. The signals applied to the outer plates 27 and 33 of capacitance probe 28 and balancing capacitor 32 are therefore equal and opposite. Capacitor 32 is adjusted to equal the capacitance of probe 28 when material 11 is absent from the probe, and the bridge is then balanced at both frequencies as may be observed at the measuring terminal.

The bridge may also be balanced at other values of balancing capacitor 32 by changing the relative magnitude of impedances 26 and 30. That is, if the capacitance of capacitor 30 is, for example, three times that of capacitor 26, the phase inverter steps the signal down by a factor of three. Balance may then be achieved by making the balancing capacitor 32 three times larger. In either case, with the bridge balanced, any change in the output of amplifier 20, as may be occasioned by changes in the amplifier 20 or its input from oscillators 10 and 12, will result in a balancing change in the oppositely phased output at amplifier 24. Thus, the bridge automatically remains at a given balance.

Although impedances 26 and 30 are preferably pure capacitors, they may also be pure resistors or even mixed elements. The important criterion is that both of the impedances be like. They need not be equal but they should introduce the substantially same phase shift at each frequency. The current through the input impedance 26 must flow through the feedback impedance 30 with no current flowing into the amplifier itself. In this case, if the impedances are like, the voltage at the output of the amplifier is of opposite phase from the input voltage but equal to the input voltage divided by the ratio of the input impedance to the feedback impedance. This ratio should be real at all frequencies; that is, the feedback impedance should be substantially like the input impedances, although its magnitude may be greater or smaller, in order that they not introduce appreciable phase shift in addition to the 180° phase shift of the amplifier 24. As used herein, like does not necessarily imply the same magnitude.

The frequency of the oscillators 10 and 12 may be changed, within the given range, without making readjustments to the bridge elements as would normally be required with transformer couplings and frequency discriminating elements. Adjustments of the bridge balance may be achieved by changing the adjustment of the balancing capacitor 32 or by changing the ratio of impedances 26 and 30. The applied voltages to the bridge may be adjusted by changing the ratio of impedances 16 or 18 to impedance 22. Changing of impedance 22 will change both signals in the same ratio. Output circuit 39 may take a number of forms. Preferably its input includes a feedback amplifier like amplifiers 20 and 24, with a feedback impedance that is purely capacitive. Output circuit 39 may be of the sort disclosed in the aforesaid copending application of Hanken, Serial No. 41,975 or preferably as shown in the copending application of Frederick L. Maltby, Albert F. G. Hanken and Donald C. Brunton, Serial No. 181,341, filed March 21, 1962, for "Measuring System." It functions to derive information to indicate the desired information as to the property of the material 11 being measured. As disclosed by Hanken, the output circuit 39 may operate to derive separate indications of the moisture content and mass per unit length of the material 11.

The power output requirement of the amplifier is dependent upon the value of the measuring probe capacity and the higher frequency used. The lower frequency power is only a small fraction of the power required by the higher frequency; the lower frequency signals add little to the power requirements of the amplifier. Because of the low output impedance of the feedback amplifiers, the bridge balance will not be upset by changes in capacitance due to normal operating conditions such as flexing of the cables or temperature changes. Also the outputs of the amplifiers will be relatively unaffected by changes of loading due to capacitive or resistive load changes thus keeping the bridge voltage and phase correctly balanced.

Although the basic circuit of FIGURE 1 is useful in many instances, it is usually desirable to include the modifications shown in FIGURE 2. In the circuit there shown, at the high frequency there is a phase lag in the signal applied to capacitor 32, so that said signal is not exactly 180° out of phase with the output of amplifier 20. This phase lag is produced mainly by the capacitive loading of amplifier 24 by the usual cable shield 34. Hence I deliberately introduce an equal phase lag in the signal applied to capacitor 28.

To this end, it is preferred that a variable resistor 41 of relatively low resistance be placed in series with the lead to the capacitance probe 28. This creates appreciable phase shift at the high frequency without substantially affecting the phase at the low frequency.

The probe 28 is not a pure capacitance due to losses in the extensive area of nominally insulating material which separates the capacitor plates and the guard structure. The insulation thus passes a small current in phase with the applied voltage, and produces a phase shift in the signal obtained through the probe at the low frequency. An equal phase shift in the signal obtained through the balancing capacitor 32 can be introduced by shunting an effectively equal current, in phase with the voltage applied to the balancing capacitor, around the capacitor. To this end, it is preferred to use a voltage divider comprising a resistor 43 having a relatively large resistance and a potentiometer 45 having a relatively low total resistance. From this potentiometer, a small amount of the phase inverted signal is taken off at tap 47 and passed through a relatively large resistor 49 to the measuring terminal 37. This operates to vary the phase of the balancing signal at the low frequency while having but relatively small effect at the high frequency.

These phase adjustments, however, introduce changes in the magnitude of the respective signals so that the bridge is not exactly balanced at both frequencies. To balance the bridge, a small amount of the appropriate signal from oscillator 10 or 12 is preferably applied to the amplifier 24. Since the amplifier 21 acted to invert the phase of the signals applied to it, the signals applied to amplifier 24 through impedance 26 are substantially 180° out of phase with the signals from the oscillators 10 and 12. Thus signals directly from the oscillators 10 and 12 may be substracted from the signals from amplifier 20 by utilizing amplifier 24 as a summing amplifier. In its preferred form, a voltage divider, comprising resistor 51 of relatively high resistance and potentiometer 53 of relatively low resistance, is connected to the high frequency oscillator 10. Tap 55 applies a small portion of the output of oscillator 10 through impedance means 57 to amplifier 24. Similarly, a potentiometer 61 of relatively low resistance applies a small portion of the output signal from oscillator 12 by way of tap 63 through impedance means 65 to the input of amplifier 24.

In order to adjust the system it is helpful to observe the bridge output on an oscilloscope. With no material 11 at the capacitance probe, the bridge is first balanced as well as possible by varying balancing capacitor 32. Resistor 41 and potentiometer 45 may then be adjusted to make the signal applied to the capacitance probe exactly 180° out of phase with the balancing phase inverted signals. This can be observed by observing the state of balance on an oscilloscope. If the bridge is still out of balance, the capacitor 32 can be adjusted until the bridge is substantially in balance at one frequency but may be out of balance at the other frequency because the balancing signal is too large. Then an appropriate amount of the phase inverted signal at the other frequency is removed by an appropriate subtractive signal applied through impedance 57 or 65, which are preferably capacitors. The amount of this subtractive signal is determined by appropriate adjustment of potentiometer 53 or 61. Obviously, a subtractive signal need be applied from only one of oscillators 10 and 12, since balance for the other frequency can be achieved without a subtractive signal. It is thus possible to leave out the circuit for applying a subtractive signal from the other oscillator. Again the state of balance can be observed by an oscilloscope. If the bridge is still not exactly in balance, it may be further balanced by repeating the steps of adjusting balancing capacitor 32, resistor 41, potentiometer 45 and potentiometer 53 or 61 until the bridge is almost exactly balanced. Then the material 11 to be measured may be passed adjacent the capacitance probe 28 and the properties of the material indicated by the output circuit 39.

Although certain and specific embodiments have been described herein, modifications may be made thereto without departing from the true spirit and scope of the invention as set forth in the appended claims. For example, the voltage dividers may be capacitive rather than resistive. It should also be noted that although the probe is called a capacitance probe, the dielectric constant of the material being measured may have an imaginary (i.e., resistive) component and the probe electrodes need not be insulated from the material being measured.

What is claimed is:

1. A system for determining a property of a dielectric material comprising: a measuring probe having first and second spaced electrodes for coupling said probe to said material, signal generating means for generating a first signal at a first frequency and a second signal at a second substantially different frequency, means connected to said signal generating means for coupling said first and second signals to said first electrode, a balancing impedance connected to said second electrode, phase inverting amplifier means having its input connected to receive the signals coupled to said first electrode for developing third and fourth signals at said respective first and second frequencies and substantially 180° out of phase with said respective first and second signals on said first electrode, means connected to said phase inverting means for applying said third and fourth signals through said balancing impedance to said second electrode to balance said first and second signals passing through said measuring probe so that there is no net signal developed at said second electrode at either of said first and second frequencies in the absence of said material at said probe, and output means connected to said second electrode for measuring a function of the signals developed thereat at both of said frequencies with said material at said probe as an indication of said property of said electric material.

2. A system for determining the moisture content of a dielectric material comprising: a measuring probe having a pair of spaced electrodes for coupling said probe to said material, a first input terminal connected to one of said pair, a measuring terminal connected to the other of said pair, a reference datum, signal generating means for generating a first signal at a first frequency and a second signal at a second substantially different frequency, means connected to said signal generating means for applying said first and second signals between said first input terminal and said reference datum, a second input terminal, phase inverting amplifier means having its input connected to said first input terminal and its output connected between said reference datum and said second input terminal for developing third and fourth signals on said second input terminal at said respective first and second frequencies and substantially 180° out of phase with said respective first and second signals on said first input terminal, a balancing impedance connected between said second input terminal and said measuring terminal, said balancing impedance at each of said first and second frequencies passing signals that balance signals passing through said measuring probe so that there is no net signal developed between said measuring terminal and said reference datum at either of said first and second frequencies in the absence of said material at said probe, and output means connected between said measuring terminal and said reference datum for measuring a function of the signals developed therebetween at both of said frequencies with said material at said probe as an indication of the moisture content of said dielectric material.

3. A system for determining a property of a dielectric material comprising: a measuring probe having first and second spaced electrodes for coupling said probe to said material, signal generating means for generating a first signal at a first frequency and a second signal at a second substantially different frequency, means connected to said signal generating means for coupling said first and second signals to said first electrode, a balancing impedance connected to said second electrode, a phase inverting amplifier having its input connected to receive the signals coupled to said first electrode for developing third and fourth signals at said respective first and second frequencies and substantially 180° out of phase with said respective first and second signals on said first electrode, means connected to said phase inverting amplifier for applying said third and fourth signals through said balancing impedance to said second electrode to balance said first and second signals passing through said measuring probe so that there is no net signal developed at said second electrode at either of said first and second frequencies in the absence of said material at said probe, and output means connected to said second electrode for measuring a function of the signals developed thereat at both of said frequencies with said material at said probe as an indication of said property of said dielectric material.

4. A system for determining a property of a dielectric material comprising: a measuring probe having a pair of spaced electrodes for coupling said probe to said material; a first input terminal connected to one of said pair; a measuring terminal connected to the other of said pair; signal generating means for generating a first signal at a first frequency and a second signal at a second substantially different frequency; means connected to said signal generating means for applying said first and second signals to said first input terminal; a second input terminal; phase inverting means having its input connected to said first input terminal and its output connected to said second input terminal for developing third and fourth signals on said second input terminal at said respective first and second frequencies and substantially 180° out of phase with said respective first and second signals on said first input terminal, said phase inverting means including a phase inverting amplifier, an input impedance connected between said first input terminal and the input of said amplifier, and a feedback impedance connected between said second input terminal and the input of said amplifier; a balancing impedance connected between said second input terminal and said measuring terminal, said balancing impedance at each of said first and second frequencies passing signals that balance signals passing through said measuring probe so that there is no net signal developed on said measuring terminal at either of said first and second frequencies in the absence of said material at said probe; and output means connected to said measuring terminal for measuring a function of the signals developed thereon at both of said frequencies with said material at said probe as an indication of said property of said dielectric material.

5. A system for determining a property of a dielectric material comprising: a measuring probe having a pair of spaced electrodes for coupling said probe to said material; a first input terminal connected to one of said pair; a measuring terminal connected to the other of said pair; signal generating means for generating a first signal at a first frequency and a second signal at a second substantially different frequency; means connected to said signal generating means for applying said first and second signals to said first input terminal; a second input terminal, phase inverting means having its input connected to said first input terminal and its output connected to said second input terminal for developing third and fourth signals on said second input terminal at said respective first and second frequencies and substantially 180° out of phase with said respective first and second signals on said first input terminal, said phase inverting means including a phase inverting amplifier, an input capacitor connected between said first input terminal and the input of said amplifier, and a feedback capacitor connected between said second input terminal and the input of said amplifier; a balancing impedance connected between said second input terminal and said measuring terminal, said balancing impedance at each of said first and second frequencies passing signals that balance signals passing through said measuring probe so that there is no net signal developed on said measuring terminal at either of said first and second frequencies in the absence of said material at said probe; and output means connected to said measuring terminal for measuring a function of the signals developed thereon at both of said frequencies with said material at said probe as an indication of said property of said dielectric material.

6. A system for determining a property of a dielectric material comprising: a measuring probe having first and second spaced electrodes for coupling said probe to said material, first signal generating means for generating a first signal at a first frequency, second signal generating means for generating a second signal at a second substantially different frequency, a summing amplifier having its inputs connected to a respective one of said signal generating means and its output coupled to said first electrode for coupling said first and second signals thereto, a balancing impedance connected to said second electrode, phase inverting means having its input connected to receive the signals coupled to said first electrode for developing third and fourth signals at said respective first and second frequencies and substantially 180° out of phase with said respective first and second signals on said first electrode, means connected to said phase inverting means for applying said third and fourth signals through said balancing impedance to said second electrode to balance said first and second signals passing through said measuring probe so that there is no net signal developed at said second electrode at either of said first and second frequencies in the absence of said material at said probe, and output means connected to said second electrode for measuring a function of the signals developed thereat at both of said frequencies with said material at said probe as an indication of said property of said dielectric material.

7. A system for determining a property of a dielectric material comprising: a measuring probe having a pair of spaced electrodes for coupling said probe to said material; a first input terminal connected to one of said pair; a measuring terminal connected to the other of said pair; first signal generating means for generating a first signal at a first frequency; second signal generating means for generating a second signal at a second substantially different frequency; means connected to said first and second signal generating means for applying said first and second signals to said first input terminal; a second input terminal; a summing amplifier having one input connected to said first input terminal and its output connected to said second input terminal for developing third and fourth signals on said second input terminal at said respective first and second frequencies and substantially 180° out of phase with said respective first and second signals on said first input terminal, said summing amplifier including a phase inverting amplifier, a first input impedance connected between said first input terminal and said one input of said amplifier; a second variable input impedance connected between one of said first and second signal generating means and another input of said amplifier whereby the output of said amplifier at one of said frequencies can be varied independently of the output at the other of said frequencies, and a feedback impedance connected between said second input terminal and the input of said amplifier; a balancing impedance connected between said second input terminal and said measuring terminal, said balancing impedance at each of said first and second frequencies developing signals thereacross that balance signals developed across said measuring probe so that there is no net signal developed on said measuring terminal at either of said first and second frequencies in the absence of said material at said probe; and output means connected to said measuring terminal for measuring a function of the signals developed thereon at both of said frequencies with said material at said probe as an indication of said property of said dielectric material.

8. A system for determining a property of a dielectric material comprising: a measuring probe having a pair of spaced electrodes for coupling said probe to said material; a first input terminal connected to one of said pair; a measuring terminal connected to the other of said pair; signal generating means for generating a first signal at a first frequency and a second signal at a second substantially different frequency; means connected to said signal generating means for applying said first and second signals to said first input terminal; a second input terminal; phase inverting means having its input connected to said first input terminal and its output connected to said second input terminal for developing third and fourth signals on said second input terminal at said respective first and second frequencies and substantially 180° out of phase with said respective first and second signals on said first input terminal; a balancing impedance connected between said second input terminal and said measuring terminal, said balancing impedance comprising a capacitor having impedance at each of said frequencies for passing balance signals substantially equal to those passing through said measuring probe, and first variable resistance means in parallel with said capacitor for adjusting the phase of said balancing signal at the lower of said frequencies; second variable resistance means comprising the connection between said measuring terminal and said other of said pair of electrodes for adjusting the phase of said balancing signal at the higher of said frequencies, whereby the system can be adjusted to produce no net signal on said measuring terminal at either of said first and second frequencies in the absence of said material at said probe; and output means connected to said measuring terminal for measuring a function of the signals developed thereon at both of said frequencies with said material at said probe as an indication of said property of said dielectric material.

9. A system for determining a property of a dielectric material comprising: a measuring probe having a pair of spaced electrodes for coupling said probe to said material; a first input terminal connected to one of said pair; a measuring terminal connected to the other of said pair; first signal generating means for generating a first signal at a first frequency; second signal generating means for generating a second signal at a second substantially different frequency; a first summing amplifier having its inputs connected to said first and second signal generating means and its output connected to said first input terminal for applying said first and second signals thereto; a second input terminal; a second summing amplifier having one input connected to said first input terminal and its output connected to said second input terminal for developing third and fourth signals on said second input terminal at said respective first and second frequencies and substantially 180° out of phase with said respective first and second signals on said first input terminal, said second summing amplifier including a phase inverting amplifier, a first input impedance connected between said first input terminal and the input of said amplifier, a second variable input impedance connected between one of said first and second signal generating means and another input of said second summing amplifier whereby the output of said second summing amplifier at one of said frequencies can be varied independently of the output at the other of said frequencies, and a feedback impedance connected between said second input terminal and the input of said amplifier; a balancing impedance connected between said second input terminal and said measuring terminal, said balancing impedance comprising a capacitor having impedance at each of said frequencies for passing balancing signals substantially equal to those passing through said measuring probe and first variable resistance means in parallel with said capacitor for adjusting the phase of said balancing signal at the lower of said frequencies; second variable resistance means comprising the connection between said measuring terminal and said other of said pair of electrodes for adjusting the phase of said balancing signal at the higher of said frequencies, whereby the system can be adjusted to produce no net signal on said measuring terminal at either of said first and second frequencies in the absence of said material at said probe; and output means connected to said measuring terminal for measuring a function of the signals developed thereon at both of said frequencies with said material at said probe as an indication of said property of said dielectric material.

10. A system for determining a property of a dielectric material comprising: a measuring probe having first and second spaced electrodes for coupling said probe to said material, balancing impedance means connected to said second electrode, signal generating means for generating a first signal at a first frequency and a second signal at a second substantially different frequency, means connected to said signal generating means for coupling said first and second signals to one of said first electrode and said balancing impedance means whereby said first and second signals are coupled to said second electrode through one of said measuring probe and said balancing impedance means, phase inverting means having its input connected to receive the signals coupled to said one of said first electrode and said balancing impedance means for developing third and fourth signals at said respective first and second frequencies and substantially 180° out of phase with said respective first and second signals at said one of said first electrode and said balancing impedance means, means connected to said phase inverting means for applying said third and fourth signals to said second electrode through the other of said measuring probe and said balancing impedance means to balance said first and second signals passing through said one of said measuring probe and said balancing impedance means so that there is no net signal developed at said second electrode at either of said first and second frequencies in the absence of said material at said probe, and output means connected to said second electrode for measuring a function of the signals developed thereat at both of said frequencies with said material at said probe as an indication of said property of said dielectric material.

11. A system for determining a property of a dielectric material comprising: a measuring probe having first and second spaced electrodes for coupling said probe to said material, balancing impedance means connected to said second electrode, signal generating means for generating a first signal at a first frequency and a second signal at a second substantially different frequency, means connected to said signal generating means for coupling said first and second signals to one of said first electrode and said balancing impedance means whereby said first and second signals are coupled to said second electrode through one of said measuring probe and said balancing impedance means, a phase inverting amplifier having its input connected to receive the signals coupled to said one of said first electrode and said balancing impedance means for developing third and fourth signals at said respective first and second frequencies and substantially 180° out of phase with said respective first and second signals at said one of said first electrode and said balancing impedance means, means connected to said phase inverting amplifier for applying said third and fourth signals to said second electrode through the other of said measuring probe and said balancing impedance means to balance said first and second signals passing through said one of said measuring probe and said balancing impedance means so that there is no net signal developed at said second electrode at either of said first and second frequencies in the absence of said material at said probe, and output means connected to said second electrode for measuring a function of the signals developed thereat at both of said frequencies with said material at said probe as an indication of said property of said dielectric material.

12. A system for determining a property of a dielectric material comprising: a measuring probe having first and second spaced electrodes for coupling said probe to said material; balancing impedance means connected to said second electrode; signal generating means for generating a first signal at a first frequency and a second signal at a second substantially different frequency; means connected to said signal generating means for coupling said first and second signals to one of said first electrode and said balancing impedance means whereby said first and second signals are coupled to said second electrode through one of said measuring probe and said balancing impedance means; phase inverting means having its input connected to receive the signals coupled to said one of said first electrode and said balancing impedance means for developing third and fourth signals at said respective first and second frequencies and substantially 180° out of phase with said respective first and second signals at said one of said first electrode and said balancing impedance means, said phase inverting means including a phase inverting amplifier, input impedance means connected between the input of said amplifier and said one of said first electrode and said balancing impedance means, and feedback impedance means connected between the output and input of said amplifier; means connected to said output of said amplifier for applying said third and fourth signals to said second electrode through the other of said measuring probe and said balancing impedance means to balance said first and second signals passing through said one of said measuring probe and said balancing impedance means so that there is no net signal developed at said second electrode at either of said first and second frequencies in the absence of said material at said probe; and output means connected to said second electrode for measuring a function of the signals developed thereat at both of said frequencies with said material at said probe as an indication of said property of said dielectric material.

13. A system for determining a property of a dielectric material comprising: a measuring probe having first and second spaced electrodes for coupling said probe to said material, first signal generating means for generating a first signal at a first frequency, second signal generating means for generating a second signal at a second substantially different frequency, a summing amplifier having its inputs each connected to said signal generating means and its output coupled to said first electrode for coupling said first and second signals thereto, balancing means, and output means coupled to said second electrode and to said balancing means for measuring a function of the signals developed by said probe at both of said frequencies with said material at said probe as an indication of said property of said dielectric material, said balancing means compensating for the capacitance of said probe at each of said frequencies in the absence of said material at said probe.

14. A system for determining a property of a dielectric material comprising: a measuring probe having first and second spaced electrodes for coupling said probe to said material, signal generating means for generating a first signal at a first frequency and a second signal at a second substantially different frequency, means connected to said signal generating means for coupling said first and second signals to said first electrode, balancing means, phase inverting amplifier means having its input connected to receive the signals coupled to said first electrode for developing third and fourth signals at said respective first and second frequencies and substantially 180° out of phase with said respective first and second signals on said first electrode, means connected to said phase inverting means for applying said third and fourth signals to said balancing means, and output means coupled to said second electrode and to said balancing means for measuring a function of the combined signals developed by said probe and said balancing means at both of said frequencies with said material at said probe as an indication of said property of said dielectric material, said balancing means developing signals to balance the signals developed by said probe to make the combined signals substantially zero at each of said frequencies in the absence of material at said probe.

15. A system for determining a property of a dielectric material comprising: a measuring probe having first and second spaced electrodes for coupling said probe to said material, balancing means, signal generating means for generating a first signal at a first frequency and a second signal at a second substantially different frequency, means connected to said signal generating means for coupling said first and second signals to one of said first electrode and said balancing means, phase inverting amplifier means having its input connected to receive the signals coupled to said one of said first electrode and said balancing means for developing third and fourth signals at said respective first and second frequencies and substantially 180° out of phase with said respective first and second signals at said one of said first electrode and said balancing means, means connected to said phase inverting means for applying said third and fourth signals to the other of said measuring probe and said balancing means, and output means coupled to said second electrode and to said balancing means for measuring a function of the combined signals developed by said probe and said balancing means at both of said frequencies with said material at said probe as an indication of said property of said dielectric material, said balancing means developing signals to balance the signals developed by said probe to make the combined signals substantially zero at each of said frequencies in the absence of material at said probe.

16. A system for determining a property of a dielectric material comprising: a measuring probe having first and second spaced electrode for coupling said probe to said material; balancing means; signal generating means for generating a first signal at a first frequency and a second signal at a second substantially different frequency; means connected to said signal generating means for coupling said first and second signals to one of said first electrode and said balancing means; phase inverting means having its input connected to receive the signals coupled to said one of said first electrode and said balancing means for developing third and fourth signals at said respective first and second frequencies and substantially 180° out of phase with said respective first and second signals at said one of said first electrode and said balancing means, said phase inverting means including a phase inverting amplifier, input impedance means connected between the input of said amplifier and said one of said first electrode and said balancing means, and feedback impedance means connected between the output and input of said amplifier; means connected to said output of said phase inverting means for applying said third and fourth signals to the other of said measuring probe and said balancing means, and output means coupled to said second electrode and to said balancing means for measuring a function of the combined signals developed at both of said frequencies with said material at said probe as an indication of said property of said dielectric material, said balancing means developing signals to balance the signals developed by said probe to make the combined signals substantially zero at each of said frequencies in the absence of material at said probe.

17. The apparatus, as described in claim 13, wherein said summing amplifier comprises an amplifier, a first impedance coupled between said first signal generating means and the amplifier input, a second impedance coupled between said second signal generating means and the amplifier input, and a third impedance coupled between the amplifier input and output.

References Cited by the Examiner

UNITED STATES PATENTS

| | | | |
|---|---|---|---|
| 2,401,779 | 6/1946 | Swartzel | 324—123 X |
| 2,623,929 | 12/1952 | Moody et al. | 324—57 |
| 2,718,620 | 9/1955 | Howe | 324—57 |
| 2,719,262 | 9/1955 | Bousman | 324—57 |

FOREIGN PATENTS 217,898   10/1958   Australia.

WALTER L. CARLSON, *Primary Examiner.*

A. E. RICHMOND, *Assistant Examiner.*